United States Patent
Higgins et al.

(10) Patent No.: US 8,424,150 B1
(45) Date of Patent: Apr. 23, 2013

(54) ROD SCRAPER

(76) Inventors: Daniel Richard Higgins, Tigard, OR (US); Michael J. Kranda, Beaverton, OR (US)

( * ) Notice: Subject to any disclaimer, the term of this patent is extended or adjusted under 35 U.S.C. 154(b) by 235 days.

(21) Appl. No.: 12/814,313

(22) Filed: Jun. 11, 2010

Related U.S. Application Data

(60) Provisional application No. 61/186,134, filed on Jun. 11, 2009.

(51) Int. Cl.
*F16J 15/32* (2006.01)

(52) U.S. Cl.
USPC .......................... 15/256.5; 15/104.04; 15/246

(58) Field of Classification Search ............... 15/104.04, 15/220.4, 246, 256.5; 277/438, 439, 907, 277/908, 370, 371, 519, 521, 511; 384/16; 166/81.1, 82.1, 173, 176
See application file for complete search history.

(56) References Cited

U.S. PATENT DOCUMENTS

| | | | |
|---|---|---|---|
| 1,822,521 A | 9/1931 | Fox et al. | |
| 2,213,923 A | 9/1940 | Stuart et al. | |
| 2,421,564 A | 6/1947 | Kleiderlein | |
| 2,443,853 A | 6/1948 | Fall | |
| 2,648,554 A * | 8/1953 | Gilbert, Sr. | 277/583 |
| 2,746,781 A * | 5/1956 | Jones | 277/566 |
| 2,761,709 A * | 9/1956 | Gilbert, Sr. | 277/513 |
| 2,772,105 A | 11/1956 | Wyse | |
| 2,945,709 A * | 7/1960 | Freed et al. | 277/511 |
| 3,313,550 A * | 4/1967 | Culman | 277/511 |
| 3,782,736 A * | 1/1974 | Valente | 277/550 |
| 4,050,514 A | 9/1977 | Prenn | |
| 4,068,759 A | 1/1978 | Abdul-Rahman | |
| 4,423,533 A | 1/1984 | Goodspeed | |
| 4,577,363 A | 3/1986 | Wyse | |
| 4,642,048 A | 2/1987 | Kim | |
| 4,729,145 A * | 3/1988 | Egner-Walter et al. | 15/250.21 |
| 4,822,428 A | 4/1989 | Goodspeed | |
| 4,872,834 A | 10/1989 | Williams, Jr. | |
| 4,971,148 A * | 11/1990 | Roche et al. | 166/88.1 |
| 4,976,208 A | 12/1990 | O'Connor | |
| 5,001,992 A | 3/1991 | Higgins et al. | |
| 5,226,375 A | 7/1993 | Fukuda | |

(Continued)

FOREIGN PATENT DOCUMENTS

JP 08-245072 9/1996

OTHER PUBLICATIONS

"Diamond Rodding Robot," http://www.diamondpower.com.au/pdf/diamondpower/AncillaryEquipment/Rodding_robot.pdf.

*Primary Examiner* — Monica Carter
*Assistant Examiner* — Andrew A Horton
(74) *Attorney, Agent, or Firm* — Scheinberg & Associates, PC; Michael O. Scheinberg

(57) ABSTRACT

An improved apparatus for cleaning linearly translating rods is described. Embodiments of the invention are suitable for use where a rod, such as a cleaning rod, is moved linearly through a stationary support, generally a cylindrical tube, such as a pneumatic cylinder, with bushings fixed inside the tube through which the rod slides. Preferred embodiments of the present invention allow the rod scraper to be attached and removed without disassembling the complete hydraulic cylinder rod apparatus. Preferred embodiments of the present invention also allow the rod scraper to float radially while its motion is constrained axially. This allows the invention to compensate for lateral displacement of a translating cylindrical cleaning rod due to normal working clearances between the cleaning rod and bushings or by bushing wear over time.

19 Claims, 4 Drawing Sheets

U.S. PATENT DOCUMENTS

| | | |
|---|---|---|
| 5,239,935 A | 8/1993 | Morrow et al. |
| 5,313,892 A | 5/1994 | Tice |
| 5,401,130 A | 3/1995 | Chiu et al. |
| 5,414,887 A | 5/1995 | Abel et al. |
| 5,724,895 A | 3/1998 | Uppstu |
| 5,794,548 A | 8/1998 | Barlow |
| 5,823,675 A | 10/1998 | Myerly |
| 6,029,302 A | 2/2000 | Coura et al. |
| 6,047,970 A | 4/2000 | Friend et al. |
| 6,358,042 B1 | 3/2002 | Moriguchi |
| 6,432,213 B2 | 8/2002 | Wang et al. |
| 7,000,744 B2 | 2/2006 | Harbu et al. |
| 2004/0150166 A1* | 8/2004 | Takahashi ............ 277/370 |
| 2009/0270817 A1 | 10/2009 | Moreno et al. |

* cited by examiner

ROD SCRAPER

This Application claim priority from U.S. Provisional Application 61/186,134, filed Jun. 11, 2009, which is hereby incorporated by reference.

TECHNICAL FIELD OF THE INVENTION

The present invention relates generally to a scraper for cleaning linearly translating cylindrical rods used for cleaning an air opening in a furnace and more particularly to apparatus for cleaning air ports in a chemical recovery boiler

BACKGROUND OF THE INVENTION

Recovery boilers, such as the chemical recovery boilers used in the pulp and paper industry, generally include a plurality of air ports located around the base of the boiler. As a side effect of the process, a build up of slag in the ports occurs which reduces oxygen flow to the boiler thereby impairing the efficiency of the whole pulp and paper making process. Automatic port cleaning systems are typically used to remove the slag that accumulates in the ports at the base of the boiler. FIG. 1 shows an example of a prior art automatic port cleaning system. These automatic systems conventionally include multiple elongated cylindrical rods 102 (cleaning rods) which are mounted in parallel on the outside wall of the boiler (by way of faceplate 104) and which are operated in a periodic reciprocating manner (typically by a pneumatic cylinder 105) so that the tip 106 of each cleaning rod is repeatedly moved into the air port opening and then retracted to free the ports of debris.

These cleaning rods are each journaled in, and reciprocated through, a pair of coaxial bushings which in turn are supported by steel tubes (fulcrum tubes 108). These cleaning rods are typically made from stainless steel and are about 1 inch diameter and reciprocate 8 inches. When the cleaner is retracted from the port openings, a portion of the cleaning rods is exposed to the harsh external recovery boiler environment and, as a result, dirt, fuel oil, black liquor (the fuel fired in a recovery boiler), salt cake dust (sodium sulfate used in the process), or other debris can form on the cleaning rods themselves. In turn, the buildup of material on the cleaning rods can cause premature wear or damage of the bushings. One method of preventing such damage is to protect the cleaning rods from exposure to the boiler environment by employing a type of collapsible elastomeric bellows 110 which prevent material from contacting the cleaning rods. Unfortunately, this solution is not ideal because the bellows material breaks down quickly in the harsh environment around the boiler. When the bellows fail, any foreign material that builds up on the exterior of the cleaning rods is drawn into the fulcrum tubes where it can wear away at the bushings. Replacement of the bellows requires time-consuming disassembly of the mechanism.

Another option is the use of a rod scraper to remove material that collects on the cleaning rods. Prior art rod scrapers are typically mounted at the end of the fulcrum tubes (in the same general area as the bellows shown in FIG. 1) so that they clean and scrape the sides of the cleaning rods as the rods are reciprocated by the pneumatic cylinder. These prior art scrapers are generally made from soft metal or plastic compounds. Prior art rod scrapers have been used to clean the cleaning rods with some success.

There are a significant number of problems with prior art scrapers, however, that are addressed by the current invention. First, prior art scrapers such as the ones commonly used, have a closed ring shape and completely encircle the cleaning rod. Disassembly of the mechanism is required to install or replace the rod scraper. For automatic port cleaners, and many other similar applications, this is very time-consuming.

Another common problem is that normal use of the cleaning rods often involves excessive lateral movement of the cleaning rods beyond what the rod scrapers can accommodate. In the typical automatic port cleaner, the working clearances between the bushings (in the fulcrum tubes) and cleaning rods may be relatively large, allowing play between the rod and bushings. The bushings are also designed to allow for significant wear, which creates larger than normal clearances after usage. This means the cleaning rods may be working offset from the original centerline of the bushings. In other words, the rod scraper should be able to accommodate significant bushing wear resulting in significant lateral displacement of the rod from its original position. Prior art rod scrapers do not allow for significant lateral displacement.

Another common problem is that the rods are typically lubricated using a grease gun that can create significant hydraulic pressure inside the fulcrum tubes. A closed-ring type rod scraper, mounted in a sealed housing, will tend to contain the hydraulic pressure developed by the grease gun. This can result in the scraper or housing popping off the end of the fulcrum tube.

Accordingly, there is a need for an improved rod scraper that avoids these problems of the prior art. Embodiments of the present invention address these problems as described below and in the appended claims.

SUMMARY OF THE INVENTION

It is an object of the invention to provide an improved apparatus for cleaning linearly translating cylindrical rods, especially where there is significant lateral displacement between the translating rod and the bushings supporting the rod. The lateral displacement may be due to normal working clearances between the cleaning rod and bushings or by wear over time of the bushing. A preferred embodiment of the invention allows the rod scraper to float radially while its motion is constrained axially. In preferred embodiments the rod scraper is formed in two halves that can be assembled around the cleaning rod without the need to disassemble the recovery boiler port cleaner.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more through understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Embodiments of the invention provide a tool that is useful for cleaning linearly translating cylindrical rods. It can be used, for example, to clean a linearly translating cylindrical rod of a hydraulic cylinder. Preferred embodiments of the present invention allow the rod scraper to be attached or removed without disassembling the complete hydraulic cylinder rod apparatus. A rod scraper according to the present invention preferably comprises four basic parts: a split housing formed from two identical radial halves, a housing clamp, a split scraper also formed from two identical radial halves, and a spring ring. Embodiments of the invention are suitable for use where a rod, such as a cleaning rod, is moved linearly through a stationary support, generally a cylindrical tube, such as a pneumatic cylinder, with bushings fixed inside the tube through which the rod slides.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. Although much of this description is directed at a rod scraper for use with the cleaning rods of automated port cleaning systems for recovery boilers, preferred embodiments would also be suitable for use with any applications and devices incorporating linear motion of cylindrical rods where the cleaning of the cylindrical rods is desirable. For example, embodiments of the present invention could be used with hydraulic cylinders used for operating aircraft landing gear, with pump rods used in oil wells, or with virtually any other type of hydraulic or pneumatic cylinders, or applications with translating cylindrical rods.

In this application, the term "proximal" will be used to indicate the direction away from the boiler when the rod scraper is in place on the cleaning rod, and the term "distal" will be used to indicate the direction toward the boiler. Also, the term "axial" will be used to indicate the direction parallel to the longitudinal axis of the cleaning rod, while the term "radial" will be used to indicate lateral movement in a direction substantially perpendicular to the long longitudinal axis of the cleaning rod.

Figure 2:
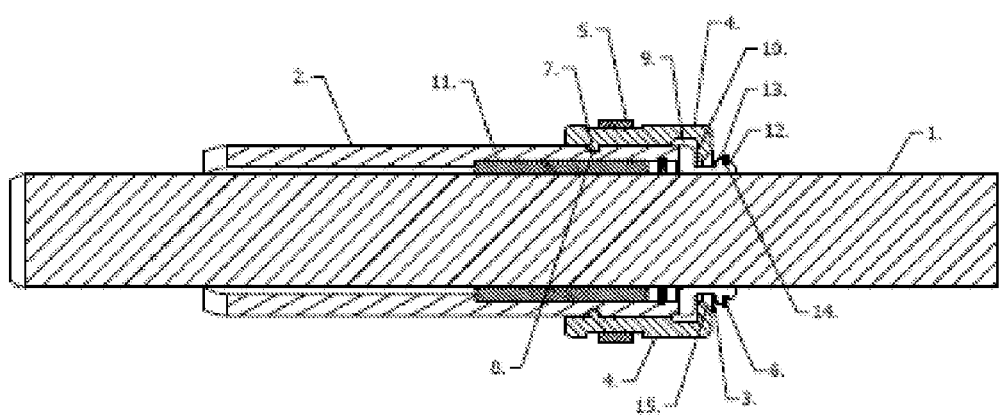
FIG. 2 is a cross section view of an assembled scraper according to a preferred embodiment of the present invention.

A preferred embodiment of the present invention is shown in FIG. 2. Referring to FIG. 2, cleaning rod 1 is a slidable cylindrical shaft with an exterior surface, a proximal end, and a distal end. Fulcrum tube 2 includes a cylindrical stationary housing having an exterior surface, an interior surface, a proximal end, and a distal end. Fulcrum tube 2 also includes a circumferential groove 8 located on its outside surface toward the proximal end of the fulcrum tube (away from the boiler). Cleaning rod 1 is journaled in fulcrum tube 2. Bushings 11, positioned between outer surface of rod 1 and inner surfaces of fulcrum tube, support cleaning rod 1.

Figure 3:
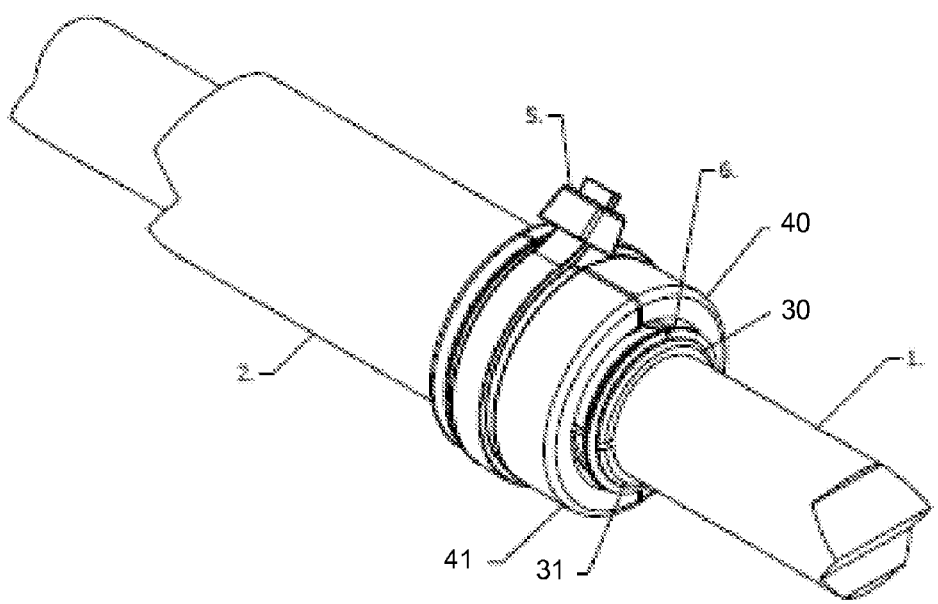
FIG. 3 is an isometric view of an assembled scraper according to a preferred embodiment of the present invention.
Figure 4:
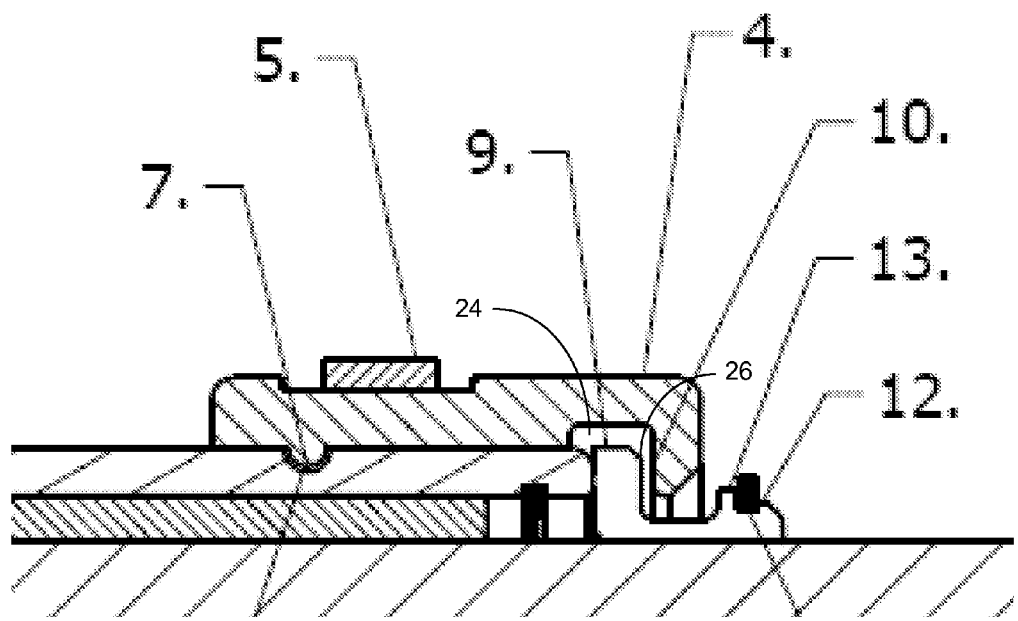
FIG. 4 is a close-up of the assembled scraper of FIG. 3 showing the gap between the scraper and the scraper housing according to a preferred embodiment of the present invention.

Referring also to FIG. 3, which is an isometric view of the assembled scraper, rod scraper 3 is formed from rod scraper halves 30 and 31. Rod scraper halves 30 and 31 include raised flange 9, land 12, and land 13. Land 12 has a chamfer on its leading edge and an outside diametrical dimension. Land 13 has a larger diametrical dimension than proximal land 12.

Rod scraper housing 4 includes halves 40 and 41. Housing halves 40 and 41 have an outside surface and inside surface, circumferential male ridge 7 located on the inside surface, and capture flange 10, located on its proximal end. Capturing flange 10 includes chamfer 15 located around the inside diameter of the outside face of capturing flange 10.

Figure 1:
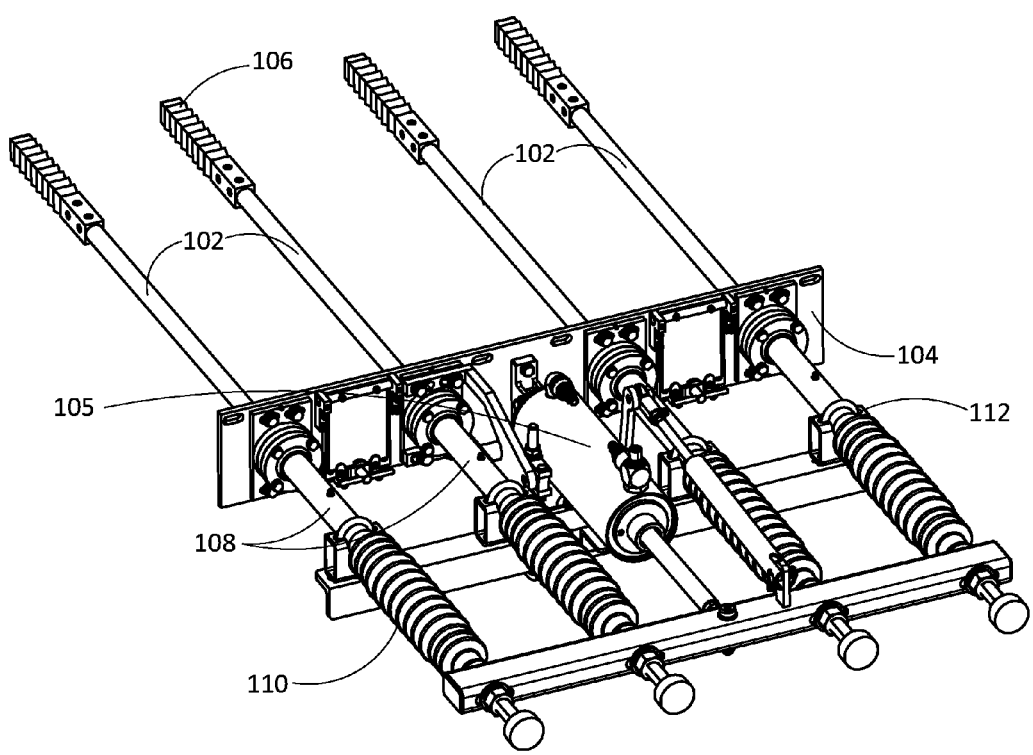
FIG. 1 shows an example of a prior art automatic port cleaning system.

Rod scraper halves 30 and 31 are positioned over exterior surface of cleaning rod 1 with raised flange 9 directed toward the proximal end of fulcrum tube 2. Referring also to FIG. 1, the rod scraper as described would be positioned at the end of the fulcrum tube in the position indicated by reference number 112. Said interior surfaces of scraper housing halves 40 and 41 are placed over scraper halves 30 and 31 so that raised flange 9 is within capture flange 10.

Housing halves 40 and 41 are shaped on their inner diameter with circumferential male ridge 7 that mates with annular groove 8 around the circumference of fulcrum tube 2. Clamp 5 is placed on housing halves 40 and 41 securely locking said housing halves to fulcrum tube 2. As shown in the present embodiment, clamp 5 is a common heavy-duty plastic cable tie but may be any clamp that can be separated and secured circumferentially around fulcrum tube 2 without requiring installation over the free end of the rod or fulcrum tube, and then sufficiently tightened to secure said housing halves 4 to said fulcrum tube 2.

Spring ring 6 is placed over scraper groove 14. A chamfer on the leading edge of land 12 aids in easing the installation of spring ring 6 into groove 14. Spring ring 6 holds scraper halves 30 and 31 together and applies a circumferential clamping force between scraper 3 and rod 1. Spring ring 6 as shown is a common spiral type retaining ring wound around scraper 3 but can be any style of ring that can be stretched over the rod without requiring installation over the free end of the rod and still provide the required clamping force.

Scraper halves 30 and 31 includes a raised flange 9 that is captured against the end of fulcrum tube 2 by turned down capturing flange 10 around the inside circumference of housing halves 40 and 41. A suitable gap is left between the end of fulcrum tube 2 and capturing flange 10, and between the outer diameter of raised flange 9 and the inner diameter of housing halves 4, to permit scraper halves 30 and 31 to move radially relative to fulcrum tube 2 and housing halves 40 and 41. This relative motion allows scraper halves 30 and 31 to "float", accommodating a loose fit between rod 1 and bushings 11 as well as significant wear of bushings 11 over time.

Land 13 has a larger diametrical dimension than land 12 to prevent spring ring 6 from over-riding the groove 14 as it is installed. The diametrical dimension of groove 14 is sized to provide the appropriate amount of compression between scraper halves 3 and cleaning rod 1 when spring ring 6 is seated. A significant feature of housing halves 4 is chamfer 15 around the inside diameter of the outside face of capturing flange 10. Chamfer 15 provides a relief for foreign material that may find its way between scraper halves 30 and 31 and housing halves 40 and 41 and to otherwise prevent any relative axial motion between the two.

There are several great advantages of the present invention over previous rod scrapers: First, being made in two halves, the scraper can be installed without disassembling the equipment it is installed on. This is a tremendous labor saving feature.

Second, the scraper portion is free to float radially within the scraper housing as the rod moves and the bushings wear. This allows the scraper to always be concentric with the rod without any radial forces applied from the rod to the scraper. Preferred embodiments of the present invention provide a scraper housing with an internal diameter that is at least 1/8 inch greater than the outer diameter of the scraper. (In the embodiment shown in FIG. 2, the capturing flange 10 of the scraper housing would have an internal diameter that is at least 1/8 inch greater than the outer diameter of the raised flange 9 of the scraper.) Referring to FIG. 3, this would allow for gap 24 which provides approximately 1/16 inch of play or float for the scraper within the housing. The interior width of capture flange 10 is also preferably wider than the raised flange 9 so that there is also an axial gap 26 also allowing float or play between the scraper and the scraper housing. As a result, if the cleaning rod were laterally displaced by as much a 1/16 of an inch, the scraper would still be concentric with the cleaning rod.

Prior art scrapers are typically mounted more or less rigidly in the fulcrum tube, resulting in premature wear of the scraper as the rod is deflected due to work clearance or bushing wear. A third advantage of the present invention is that the gaps 13 between the two scraper halves 3, and between the scraper halves 3 and the housing halves 4, allows any pressure built up inside support tube 2 to be released without creating a linear force that tries to separate the scraper from the support tube. As a result, lubricating the bushings with a grease gun will not pressurize the support tube and will not force the scraper off the end of the tube.

Fourth, the gaps 12 between the scraper halves allow the two halves of the scraper to come together over time as the scraper wears. This allows the scraper to continue working effectively with less initial applied pressure. In other words, the pressure of the spring pushes the scraper halves inward toward the cleaning rod, keeping the scraper pressed against the cleaning rod. As the edge of the scraper is worn during normal use, the scraper is pressed further inward to compensate for wear and keep the edge of the scraper against the cleaning rod. Current ring-type scrapers are pressurized significantly when new to force the material to compress as it wears. Otherwise the scraper would wear out very quickly. The disadvantage of the prior art design is that the ring-type scrapers develop significant friction between the scraper and the rod requiring additional force from the pneumatic cylinder to overcome this friction. The present invention, by contrast, only requires sufficient pressure to ensure cleaning the rod, as the gaps between the two halves will close as the scraper wears. No additional force is needed to compress the scraper over time.

A rod scraper according to the present invention can preferably be made from a variety of materials, including, for example, a carbon and graphite filled polytetrafluoroethylene compound. The housing of the rod scraper according to the present invention is preferably formed from a material that is inexpensive, rigid, easily formed or machined, and has suitable temperature and chemical resistance. In a preferred embodiment, the housing is made, for example, from nylon, an acetal compound, a polysulfone, or a similar polymer.

Although embodiments of the present invention and various advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The appended claims are therefore intended to cover all such changes and modifications as fall within the true spirit and scope of the invention.

We claim as follows:

1. A rod scraper for cleaning a translating cylindrical rod, the rod scraper comprising:
   a scraper ring having a center opening for passing a cylindrical rod and having an interior scraping edge for removing foreign material from the cylindrical rod as the cylindrical rod is moved relative to the scraper ring; and
   an annular scraper housing adapted for mounting to a stationary support for the cylindrical rod and having a center opening for passing the cylindrical rod, the annular scraper housing having a lower surface to receive an upper flange on the scraper ring and hold the scraper ring in position between the annular scraper housing and the cylindrical rod;
   wherein the scraper ring and the annular scraper housing are each formed in two connectable portions so that the rod scraper can be assembled around the cylindrical rod without sliding the annular scraper housing or the scraper ring over an end of the cylindrical rod; and
   wherein the annular scraper housing holds the scraper ring and prevents the scraper ring from translating axially relative to the annular scraper housing while allowing the scraper ring to translate radially relative to the annular scraper housing.

2. The rod scraper of claim 1 further comprising a circumferential spring to compress the two connectable portions of the scraper ring around the cylindrical rod.

3. The rod scraper of claim 2 in which the circumferential spring is a spiral retaining ring.

4. The rod scraper of claim 2 wherein the scraping edge of the scraper ring is pressed against the outer surface of the cylindrical rod by the circumferential spring.

5. The rod scraper of claim 4 in which there exists a gap between the two portions of the scraper ring when the scraper ring is assembled around the cylindrical rod.

6. The rod scraper of claim 5 in which the circumferential spring compresses the two portions of the scraper ring so that the gap will close as the scraper edge wears to allow the scraper edge to be pressed further inward to compensate for wear and keep the edge of the scraper against the cylindrical rod.

7. The rod scraper of claim 1 in which the annular scraper housing includes an inward turning flange to hold the scraper ring in position within the annular scraper housing, the inside diameter of said flange being smaller than the outer diameter of the scraper ring.

8. The rod scraper of claim 7 in which the annular scraper housing includes a ridge around the inside diameter of said annular scraper housing that interlocks with a matching groove around the outside diameter of said stationary support.

9. The rod scraper of claim 8 in which the inside diameter of the annular scraper housing is at least 1/8 inch greater than the outer diameter of the scraper ring.

10. The rod scraper of claim 1 in which the two portions of the annular scraper housing are secured to the stationary support by a circumferential clamp.

11. The rod scraper of claim 10 in which the scraper ring is captured between the stationary support and the inward turning flange of the annular scraper housing and thereby prevented from translating axially relative to the annular scraper housing and the stationary support.

12. The rod scraper of claim 11 in which the scraper ring can move laterally within the annular scraper housing to compensate for lateral movements of a translating cylindrical rod.

13. The rod scraper of claim 1 in which the scraper ring comprises a polytetrafluoroethylene compound.

14. A rod scraper for cleaning translating cylindrical cleaning rods in a recovery boiler, the rod scraper comprising:
- an annular scraper housing having a center opening adapted for passing a cylindrical recovery boiler cleaning rod, the annular scraper housing adapted for mounting to a stationary support for the cylindrical recovery boiler cleaning rod;
- a scraper ring having a center opening for passing a cylindrical rod and having an interior scraping edge for removing foreign material from the cylindrical rod as the cylindrical rod is moved relative to the scraper ring;
- wherein the annular scraper housing has a lower surface adapted to receive an upper flange on the scraper ring so that the scraper ring can be held in position between the annular scraper housing and the cylindrical recovery boiler cleaning rod; and
- wherein the internal diameter of the lower surface of the annular scraper housing is greater than the outer diameter of the upper flange on the scraper ring so that the scraper ring while held in position can still move laterally relative to the annular scraper housing yet remain concentric with the cylindrical recovery boiler cleaning rod.

15. The rod scraper of claim 14 wherein the annular scraper housing and the scraper ring are each formed in two connectable halves so that the rod scraper can be assembled around the cylindrical recovery boiler cleaning rod without sliding the annular scraper housing or the scraper ring over an end of the rod.

16. The rod scraper of claim 14 wherein the scraping edge of the scraper ring is pressed against the outer surface of the cylindrical recovery boiler cleaning rod by a circumferential spring.

17. The rod scraper of 16 in which there exists a gap between the two portions of the scraper ring when the scraper ring is assembled around the cylindrical recovery boiler cleaning rod.

18. The rod scraper of claim 17 in which the circumferential spring compresses the two portions of the scraper ring so that the gap will close as the scraper edge wears to allow the scraper edge to be pressed further inward to compensate for wear and keep the edge of the scraper against the cylindrical recovery boiler cleaning rod.

19. The rod scraper of claim 14 wherein the internal diameter of the lower surface of the annular scraper housing is at least ⅛ inch greater than the outer diameter of the upper flange on the scraper ring.

\* \* \* \* \*